United States Patent
Rueger et al.

(10) Patent No.: US 12,392,822 B2
(45) Date of Patent: Aug. 19, 2025

(54) VOLTAGE GLITCH DETECTORS

(71) Applicant: Silicon Laboratories Inc., Austin, TX (US)

(72) Inventors: Timothy Thomas Rueger, Liberty Hill, TX (US); Dewitt Clinton Seward, Arlington, MA (US); Gang Yuan, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 207 days.

(21) Appl. No.: 18/235,156

(22) Filed: Aug. 17, 2023

(65) Prior Publication Data
US 2025/0060409 A1    Feb. 20, 2025

(51) Int. Cl.
*G01R 31/30* (2006.01)
*G01R 19/165* (2006.01)
*G01R 31/40* (2020.01)
*G06F 21/75* (2013.01)

(52) U.S. Cl.
CPC ... *G01R 31/3004* (2013.01); *G01R 19/16552* (2013.01); *G01R 31/40* (2013.01); *G06F 21/755* (2017.08)

(58) Field of Classification Search
CPC .......... G01R 31/3004; G01R 19/16552; G01R 31/40; G06F 21/755
USPC ........................ 324/762.02, 762.01, 537, 500
See application file for complete search history.

(56) References Cited

U.S. PATENT DOCUMENTS

| | | | |
|---|---|---|---|
| 9,557,355 B2 * | 1/2017 | Swoboda | G01R 31/2851 |
| 10,228,415 B1 * | 3/2019 | Koay | H03K 19/1776 |
| 10,785,016 B2 | 9/2020 | Seward | |
| 11,366,898 B2 | 6/2022 | Sonntag et al. | |
| 2013/0142237 A1 | 6/2013 | Drooghaag | |
| 2018/0349600 A1 | 12/2018 | Elenes et al. | |
| 2019/0013281 A1 | 1/2019 | Elenes et al. | |
| 2019/0189390 A1 | 6/2019 | Nelson | |
| 2020/0034544 A1 | 1/2020 | Cooreman | |
| 2020/0243152 A1 | 7/2020 | Wappis | |

(Continued)

OTHER PUBLICATIONS

Kelley, H., and Alonso, G., "LTC6244 High Speed Peak Detector," Analog Devices, Inc., 1995-2022, downloaded from https://www.analog.com/en/technical-articles/ltc6244-high-speed-peak-detector.html, Aug. 17, 2022.

(Continued)

*Primary Examiner* — Giovanni Astacio-Oquendo
(74) *Attorney, Agent, or Firm* — Zagorin Cave LLP

(57) ABSTRACT

Positive and negative glitch detectors detect glitches on a supply voltage node. The positive glitch detector has a capacitor and a resistor serially coupled between the supply voltage node and ground. An amplifier is coupled to a first node between the capacitor and resistor. A positive glitch results in the glitch on the first node (normally biased low) and generation of a clock pulse by the amplifier that causes a latch to assert its output to indicate the positive glitch. The negative glitch detector has a capacitor and resistor coupled in parallel between the supply voltage node and a second node. A negative glitch on the supply voltage node decreases the voltage on the second node (normally biased high) and an inverting amplifier coupled to the second node generates a clock pulse to cause a latch to assert its output to indicate the negative voltage glitch.

23 Claims, 7 Drawing Sheets

(56) References Cited

U.S. PATENT DOCUMENTS

2023/0065352 A1* 3/2023 O'Connell ............ H02M 3/155
2024/0110954 A1   4/2024 Seward et al.
2024/0271919 A1   8/2024 Clark

OTHER PUBLICATIONS

Nemiroff, D., and Tokunaga, C., "Tunable Replica Circuit for Fault-Injection Detection," Blackhat USA 2022, Aug. 10, 2022, 31 pages.
U.S. Appl. No. 17/957,214, filed Sep. 30, 2022, entitled "Asynchronous Peak Hold Circuit On an Integrated Circuit Trace To Monitor for Voltage Spikes Caused By an Electromagnetic Pulse," by inventors DeWitt C. Seward et al.

* cited by examiner

VOLTAGE GLITCH DETECTORS

BACKGROUND

Field of the Invention

This disclosure relates to detection of glitches intentionally introduced into an integrated circuit for tampering purposes.

Description of the Related Art

Various kinds of attacks have been used against integrated circuits to breach security barriers. For example, power supply glitch attacks insert a glitch in the power being supplied to the integrated circuit. Glitching attacks can be used to cause the integrated circuit to malfunction allowing the attacker unauthorized access to, e.g., extract secret keys, open up a locked debug port, or force a chip to accept and run improperly signed firmware, thus allowing access to functionality that ordinarily would not be available.

In addition to power supply glitch attacks, electromagnetic pulse (EMP) glitching has become a viable attack vector for integrated circuits. An EMP glitching attack directs an electromagnetic pulse towards an integrated circuit, which causes a voltage spike in the integrated circuit leading to malfunctions similar to power supply glitch attacks. EMP glitches can circumvent power supply glitch detection circuits and mitigations because the EMP creates glitches on the power traces on the silicon rather than at power supply pins.

Several approaches have been used to detect an EMP attack. One approach uses synchronous detection techniques that rely on circuit behaviors that occur around a clock pulse in the integrated circuit. However, EMP pulses can be very short, e.g., 0.5-5 ns while a clock frequency used in an internet of things (IOT) integrated circuit is, e.g., 80 MHz or a period of 12.5 ns. One synchronous approach uses a high frequency clock signal (>1 GHz) for detection, but that approach requires significant increased power for the high frequency clock signal, which is undesirable particularly for an IOT application. Thus, many voltage spikes induced by an EMP attack go undetected if they do not properly align with the clock pulse or if they are too short to be detected. These short pulses can still generate exploit behavior. Another detection approach uses loops built into metal layers of the integrated circuit. That approach relies on detection of current induced in the metal loops by the magnetic field of the EMP to indicate an EMP attack. However, the current loops are not sufficiently sensitive to an EMP. Unless the pulse is received close to the loop, the EMP goes undetected. In addition, the loops can be costly in terms of routing area. With expanding IOT applications and the associated need to maintain and even increase security, improved techniques for detecting tamper threats to integrated circuits is desirable.

SUMMARY OF EMBODIMENTS OF THE INVENTION

The ability to detect attacks and react appropriately is becoming an important defense in silicon chip security. Accordingly, in one embodiment an integrated circuit includes a positive voltage glitch detector. The positive glitch detector has a filter coupled to a supply voltage node and the filter supplies a filtered supply voltage. A capacitor is coupled between the supply voltage node and a first node and a resistor is coupled between the first node and a ground node. A first circuit has an input coupled to the first node and is coupled to receive the filtered supply voltage as a first circuit supply voltage and the first circuit supplies a first output signal. A latch circuit has a clock input coupled to the first output signal and has a data input coupled to the filtered supply voltage. In response to a positive glitch occurring on the supply voltage node, a positive voltage pulse corresponding to the voltage glitch is generated on the first node, the latch circuit is clocked by the output signal supplied by the first circuit, and a state of the latch circuit changes to supply an asserted latch output signal indicative of the positive glitch.

In another embodiment a method for detecting glitches in an integrated circuit is provided that includes filtering a supply voltage on a supply voltage node to generate a filtered supply voltage and supplying the filtered supply voltage to a data input of a latch circuit. A positive voltage glitch occurring on the supply voltage node causes a voltage increase corresponding to the positive voltage glitch to appear on a node between a capacitor and a resistor that are serially coupled between the supply voltage node and ground. The method further includes supplying the voltage increase on the node to a first circuit and generating a first circuit output signal. The latch circuit is clocked using the first circuit output signal, which causes the latch circuit to supply an asserted latch signal indicative of the positive voltage glitch.

In another embodiment an integrated circuit includes a filter coupled to a supply voltage node that receives a supply voltage and provides a filtered supply voltage. The integrated circuit includes a positive glitch detector circuit that contains a first capacitor and a first resistor serially coupled between the supply voltage node and ground. The positive glitch detector further contains a first amplifier circuit having an input coupled to a first node between the first capacitor and the first resistor. The first amplifier circuit supplies a first output signal to a clock input of a first latch circuit that has a data input coupled to the filtered supply voltage. The integrated circuit also includes a negative glitch detector containing a second capacitor and a second resistor coupled in parallel between the supply voltage node and a second node. A second amplifier circuit has an input coupled to the second node and is configured to supply a second output signal to a second clock input of a second latch circuit that has a second data input coupled to the filtered supply voltage.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
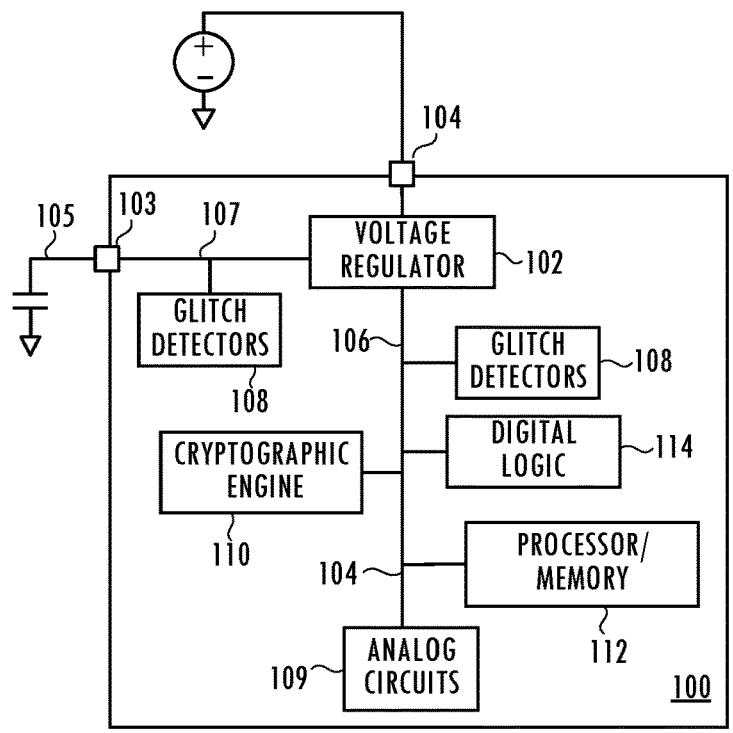
FIG. 1 is a simplified high level block diagram of an integrated circuit incorporating glitch detectors.

Semiconductor circuits typically utilize several major traces to route power (typically including one or more positive voltage traces and one or more ground voltage traces) to specific parts of the chip. In the simplified high level block diagram of the integrated circuit 100 shown in FIG. 1, a voltage regulator 102 receives a DC voltage at input terminal 104, e.g., from a battery. The voltage regulator 102 supplies a regulated voltage on trace 106 to various regions of the integrated circuit including analog circuits 109, the cryptographic engine 110, processor/memory 112, and other digital logic 114. A decoupling capacitor 105 is coupled to the voltage regulator 102 at terminal 103. Glitch detector circuits 108 are coupled to the traces 106 and 107 to detect voltage glitches (positive or negative glitches) induced by an EMP or a voltage spike intentionally introduced on the power supply input terminal 104. A voltage glitch as utilized herein is a transient change in a positive or negative direction from a nominal voltage value. In embodiments, the glitch detectors are RC-based glitch detector circuits as described more fully herein. While the embodiment of FIG. 1 shows a single voltage regulator 102, other embodiments utilize multiple voltage regulators to supply power independently to specific parts of the chip. For example, power supply input terminal 104 may be utilized by digital circuits 114 and the processor/memory 112 while the analog circuits receive power from a different regulator and/or a different terminal. The integrated circuit according to embodiments described herein places a pair of glitch detectors (positive and negative) on long power traces or other places of interest. Embodiments can place the positive and negative pairs on any trace (typically a long trace) that is sensitive to an attack that could affect operation of the integrated circuit and in particular cause an alteration in chip function that could be exploited by the attacker. While FIG. 1 shows glitch detector circuits 108 only covering voltage glitches on traces 106 and 107, embodiments may include multiple pairs of detector circuit, e.g., 8 or 16 pairs of detector circuits distributed throughout digital circuits 114 and processor to monitor the digital logic that can malfunction during an attack. Other embodiments may instead or in addition place the detectors to detect glitches on power planes of interest.

Figure 2:
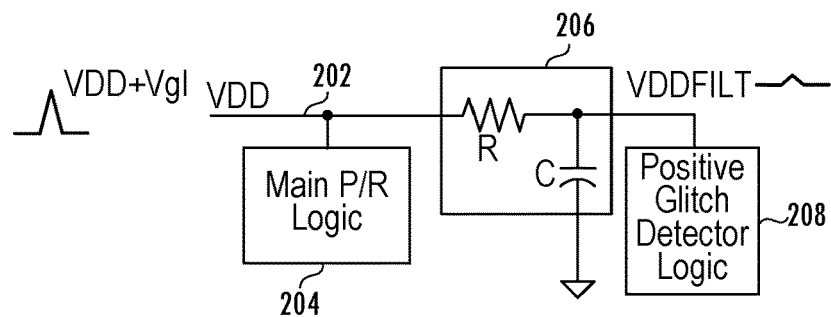
FIG. 2 illustrates an aspect of a positive glitch detector according to an embodiment.

The high-level block diagram shown in FIG. 2 illustrates an aspect of the positive glitch detector. Power supply trace 202 supplies voltage to the main place and route (P/R) logic 204 that contain, e.g., the digital logic 114, processor 112, as well as cryptographic engine 110, which is the block many attackers are seeking to exploit. A low pass RC filter 206 filters the power supply voltage VDD before it is supplied to the positive glitch detector logic 208. The filter 206 ensures that the positive glitch detector logic 208 receives a voltage suitable for correct operation even when a positive voltage glitch occurs on VDD, thereby helping to ensure accurate detection of a positive voltage glitch on VDD.

Figure 3:
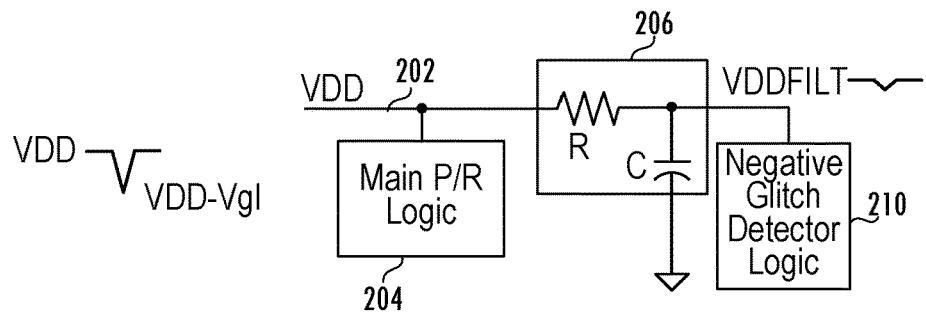
FIG. 3 illustrates an aspect of a negative glitch detector according to an embodiment.

The high-level block diagram shown in FIG. 3 illustrates an aspect of the negative glitch detector. As in FIG. 2, power supply trace 202 supplies voltage to the main place and route (P/R) logic 204 that contain, e.g., the digital logic 114 and processor 112. The low pass RC filter 206 filters the power supply voltage VDD before it is supplied to the negative glitch detector logic 210. The filter 206 ensures that the negative glitch detector logic 210 receives a voltage suitable for proper operation even when a voltage glitch occurs on VDD, thereby helping to ensure accurate detection of a negative voltage glitch on VDD.

Figure 4:
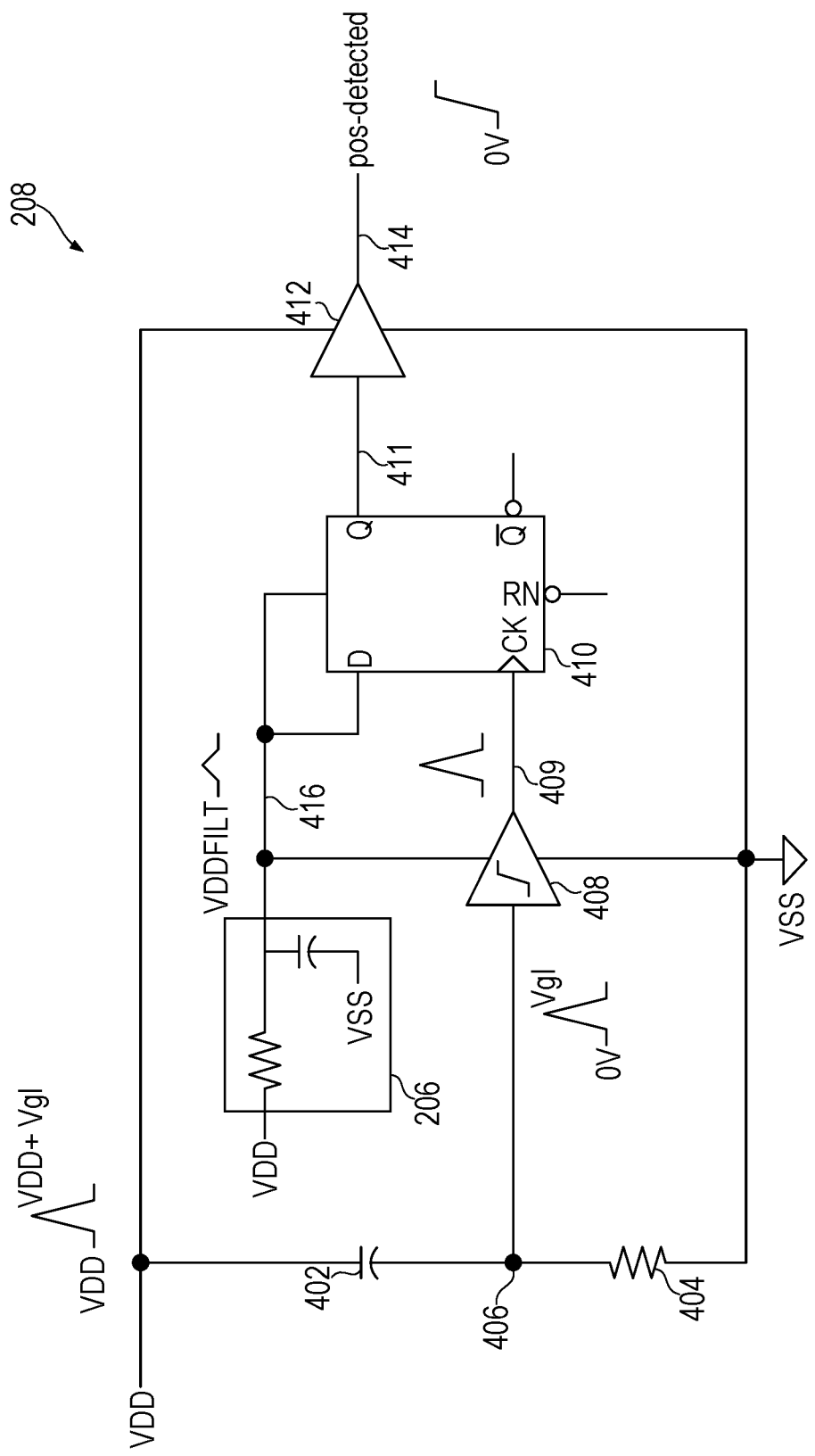
FIG. 4 illustrates an embodiment of a positive glitch detector.

FIG. 4 illustrates an embodiment of the positive glitch detector 208. FIG. 4 shows the low pass filter 206 that provides a filtered VDD (VDDFILT) to the detector logic. The detector 208 includes the serially coupled capacitor 402 and resistor 404, which are coupled between VDD and ground (VSS). During normal operation (absent a positive glitch event) the node 406 is biased to VSS through resistor 404. During a positive voltage glitch (Vgl) event, the voltage on the VDD node rises to VDD+Vgl and the capacitor 402 AC couples the voltage glitch Vgl to node 406. An amplifier circuit 408 receives the Vgl pulse and supplies a pulse on signal line 409, which latch 410 (shown as a D flip-flip in FIG. 4) uses as a clock signal. As explained further herein, in embodiments the amplifier function is implemented using logic gates. Of course, other implementations of an amplifier circuit can be used. The amplifier circuit 408 should respond to a pulse on node 406 corresponding to the positive voltage glitch to supply a pulse signal with a rising edge to the clock input (CK) of latch 410 sufficient to cause the latch to latch in a positive value. The data input D of the latch 410 is coupled to the filtered supply voltage on node. Assuming the latch has been reset through the active low reset terminal RN, the rising edge of the pulse supplied by amplifier 408 causes the latch 410 to latch a logical "1" and assert its Q output on 411 indicating a positive pulse was detected. Buffer circuit 412 receives the asserted Q output and supplies an asserted positive pulse detected signal (pos-detected) 414. Normally (absent a positive glitch event), the Q output supplied by latch 410 and positive glitch detected (pos-detected) signal 414 supplied by the buffer circuit 412 are logically low (0V in the embodiment of FIG. 4). Note that buffer circuit 412 receives the unfiltered supply voltage VDD. The amplifier 408 and latch 410 receive the filtered supply voltage 416 to help ensure proper operation of the detector circuit 208 during a positive glitch event. Note that in embodiments the magnitude of the pulse on node 406 may not equal Vgl exactly but the voltage pulse on node 406 corresponds to the voltage glitch Vgl on VDD in that the pulse on node 406 resulting from the positive voltage glitch on VDD results in latch 410 latching in a positive value, thus triggering an alert when Vgl has a magnitude above a particular threshold of interest. In other embodiments the voltage pulse on node 406 corresponds to the voltage glitch Vgl on VDD by being equal or substantially equal to Vgl.

Figure 5:
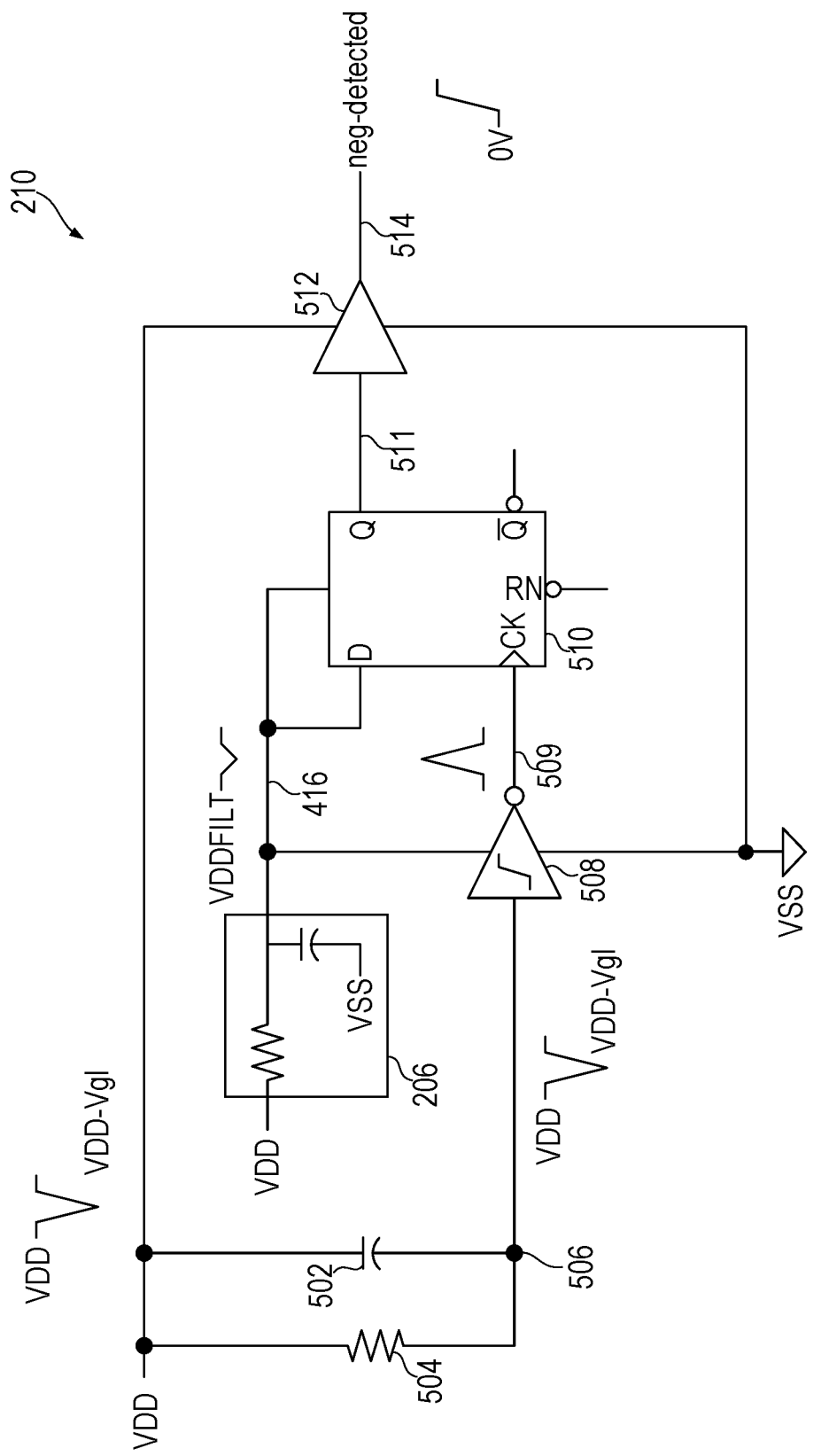
FIG. 5 illustrates an embodiment of a negative glitch detector.

FIG. 5 illustrates an embodiment of the negative glitch detector 210. The RC filter 206 provides a filtered VDD to the negative glitch detector logic 210. In embodiments the positive and negative glitch detector circuits 208 and 210 use the same filtered VDD signal supplied by the filter 206. In other embodiments, a separate VDD filter may be used if the placement of the circuit on the integrated circuit makes duplication of the filter more convenient. In some embodiments multiple pairs of positive and negative glitch detectors use the filter 206. The detector 210 includes the capacitor 502 and resistor 504, which are coupled in parallel between VDD and node 506. During normal operation (absent a negative glitch event) the node 506 is biased to VDD through resistor 504. During a negative voltage glitch (−Vgl)

event, the voltage on the VDD node is reduced to (VDD−Vgl), and node 506 is reduced to (VDD−Vgl) through capacitor 506. The reduction in voltage, assuming a sufficiently large magnitude of (−Vgl), causes the inverting amplifier circuit 508 to supply a positive pulse used as a clock signal by the latch 510 (shown as a D flip-flip in FIG. 5). As described further herein, in embodiments the inverting amplifier circuit 508 is implemented by logic gates. The data input D of the latch 510 is coupled to the filtered supply voltage on node 416. Assuming the latch 510 has been reset through the active low reset terminal RN prior to the negative voltage glitch event, the pulse supplied by inverting amplifier 508 on signal line 509 causes the latch 510 to latch a logical "1" and assert its Q output on signal line 511 indicating a negative pulse was detected. Buffer circuit 512 receives the asserted Q output and supplies an asserted negative pulse detected signal (neg-detected) signal 514. Normally (absent a negative glitch event), the Q output supplied by latch 510 and neg-detected signal 514 supplied by the buffer circuit 512 are at 0V. The amplifier 508 and latch 510 receive the filtered supply voltage 416 as their supply voltage to help ensure proper operation of the negative detector circuit 210 during a negative glitch event. The RC filter 206 keeps the flip-flop 510 from changing state in the presence of negative glitches on the supply voltage VDD. Note that buffer circuit 512 receives the unfiltered supply voltage VDD. Note that in embodiments the magnitude of the reduction in voltage on node 506 may not equal (−Vgl) exactly but the negative voltage pulse on node 506 corresponds to the voltage glitch (−Vgl) on VDD in that the negative voltage pulse on node 506 caused by the negative voltage glitch on VDD results in latch 510 latching in a positive value, thus triggering an alert when (−Vgl) has a magnitude above a particular threshold of interest. In other embodiments the negative voltage pulse on node 506 corresponds to the negative voltage glitch (−Vgl) on VDD by being equal or substantially equal to (−Vgl).

Figure 6:
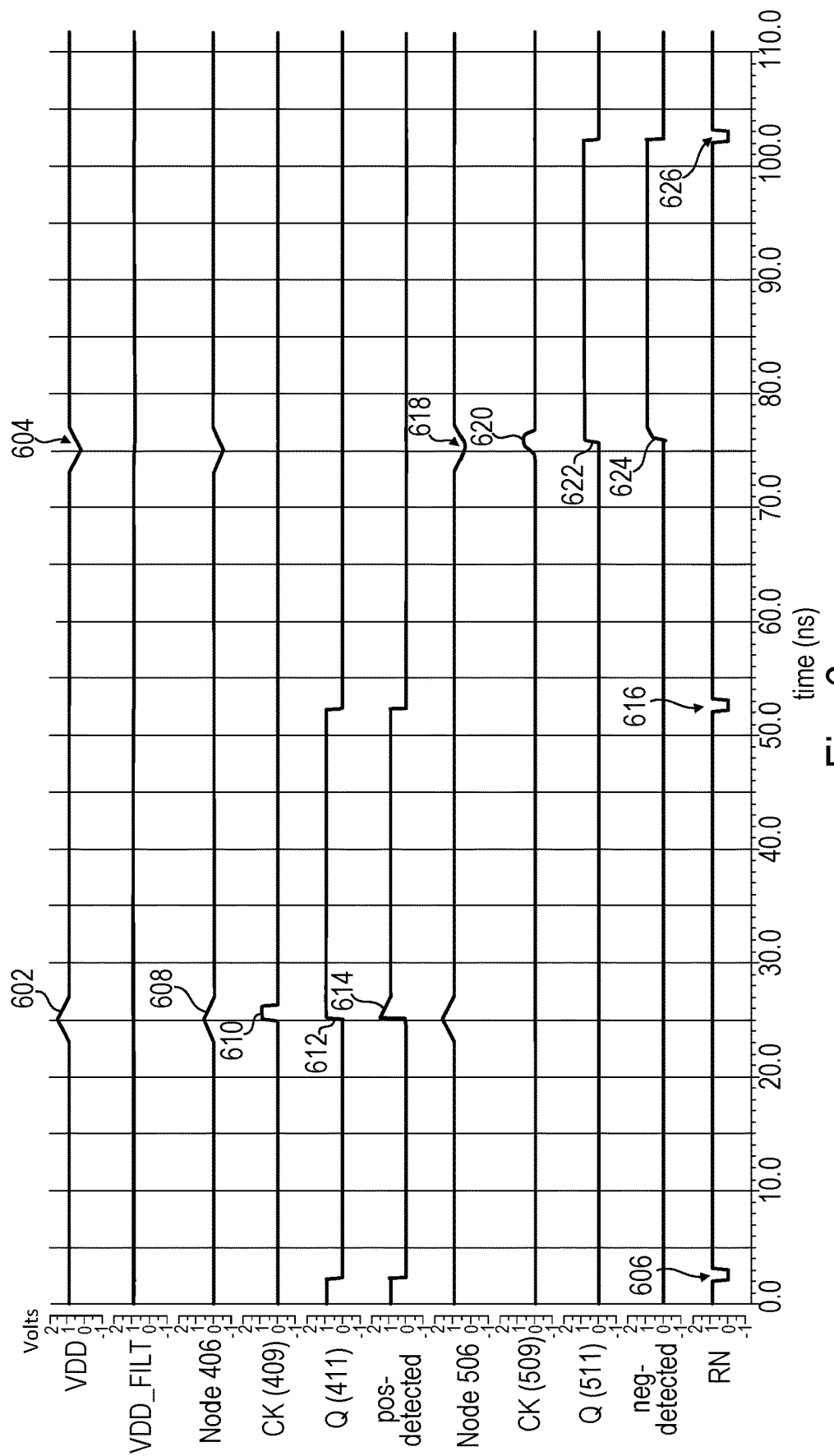
FIG. 6 is a timing diagram illustrating operation of the positive glitch detector and the negative glitch detector.

FIG. 6 shows a timing diagram illustrating the operation of the positive glitch detector 208 and the negative glitch detector 210 illustrated respectively in FIGS. 4 and 5. The operation of the positive glitch detector will be described first. VDD reflects the voltage on the supply voltage node that has a positive glitch at 602 and a negative glitch at 604. The filtered supply voltage VDD_FILT remains substantially constant. Prior to the glitch events, e.g., at power-up, the outputs of the flip-flops 410 and 510 are unknown and RN is asserted at 606 to place the flip-flops of the glitch detectors into a known state with flip-flop outputs Q 411 and Q 511 low and pos-detected and neg-detected unasserted. The positive voltage glitch at 602 results in the glitch voltage Vgl appearing on node 406 as shown at 608, which is the input to the amplifier (see FIG. 4). The pulse signal shown at 610 on signal line 409 from the amplifier 408 functions as a clock signal for the flip-flop 410, which latches in a positive value and supplies an asserted Q output at 612. The buffer circuit 412 receives the asserted Q output and supplies an asserted pos-detected signal at 614. Note that the rising edge of pos-detected signal reflects the glitch since the buffer 412 is coupled to the supply voltage node VDD rather than to the filtered supply voltage VDD_FILT in the embodiment illustrated in FIG. 4. The asserted pos-detected signal at 614 results in appropriate processing of the detected glitch as described further herein. Processing resulting from the positive glitch being detected includes asserting reset signal RN at 616 causing Q (411) and pos-detected to deassert, thereby allowing the positive glitch detect logic to be ready to detect another positive glitch event.

The negative voltage glitch at 604 results in the reduced voltage (VDD-Vgl) appearing on node 506 at 618, which is the input to the amplifier (see FIG. 5). The output of the amplifier shown at 620 functions as a clock signal for the flip-flop 510, which latches in a positive value and supplies an asserted Q output at 622. The buffer 512 receives the asserted Q output signal and supplies an asserted neg-detected signal at 624. Note that the rising edge of the neg-detected signal reflects the negative voltage glitch since the buffer 512 is coupled to the supply voltage node VDD rather than the filtered supply voltage VDD_FILT. The asserted neg-detected signal results in appropriate processing of the detected glitch as described further herein. Processing resulting from the negative glitch being detected includes asserting reset signal RN at 626 causing Q (511) and neg-detected to deassert, thereby allowing the negative glitch detect logic to detect another negative glitch event.

Figure 7:
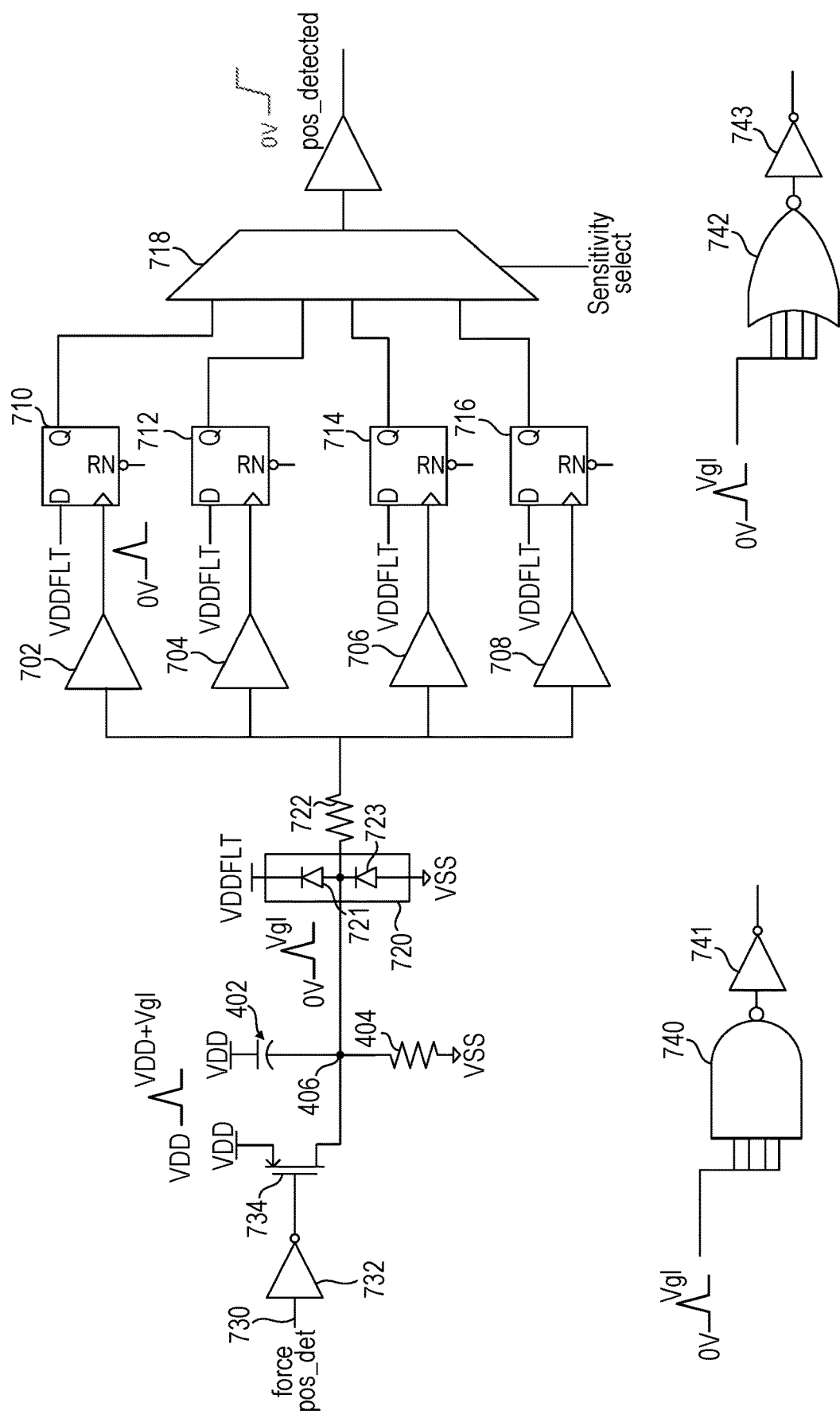
FIG. 7 illustrates additional details of an embodiment of a positive glitch detector.

FIG. 7 illustrates additional details of an embodiment of the positive glitch detector logic 208. In some embodiments it would be desirable to select a threshold for the glitch detector logic to trigger an alert. Accordingly, the detector logic includes amplifier circuits 702, 704, 706, and 708 with different thresholds. The amplifiers respond to a Vgl above their respective thresholds by supplying a rising edge of a clock pulse to the latches 710, 712, 714, and 716 and the falling edge of the clock pulse is generated as Vgl falls below the threshold values for the Q outputs of the latches to return to 0. Since some glitches on VDD are part of normal operation, e.g., power up and normal supply ripple, only those glitches that have a magnitude above a particular threshold are of interest. Multiplexer 718 selects the amplifier with the desired threshold. The selection of the amplifier may be fixed during manufacturing testing or dynamic based on, e.g., temperature or supply voltage. Absent a way to ignore supply voltage glitches that will not impact secure chip operations, normal variations in the supply voltage could trigger a response that an attack was underway and interfere with normal chip operations. That is, false positives should be avoided. In other embodiments, such as shown in FIG. 4, the desired threshold is known and a single amplifier is utilized.

FIG. 7 also shows a voltage clamp 720 that protects the detector logic from a large voltage spike on node 406. The upper diode 721 limits positive voltage spikes on node 406 that are greater than one diode threshold above VDD. The lower diode 723 limits negative voltage spikes on node 406 that are greater than one diode threshold below VSS. Of course, other types of voltage clamps can be used. Resistor 722 limits current to avoid destructive current levels. FIG. 7 also shows the capacitor 402 and resistor 404 (also shown in FIG. 4) and node 406 coupled to the input of the amplifiers.

FIG. 7 illustrates a scan feature utilized in some embodiments to allow for stuck at fault testing for the latch(es) used in the positive voltage glitch detector and to check logic downstream of the latches. The latches may be designed without more typical scan functionality. For the positive glitch detector the asserted forcing signal 730 is supplied to inverter 732, which in turn supplies the inverted forcing signal to the gate of pull-up transistor 734. The pull-up transistor 734 pulls up node 406 to a high level causing pos-detected to assert.

The amplifier circuits 408 (FIG. 4) and 702-708 can be implemented using digital logic gates such as digital logic gates 740 or 742. For example, a four input NAND gate 740 with all the inputs tied together followed by an inverter 741 or a four input NOR gate 742 with all the inputs tied together followed by an inverter 743 can function as a suitable amplifier. The threshold voltage of the logic gates is selected so the logic state of the gates switch when Vgl rises above a chosen threshold. Of course, other logic gates and/or logic gates with different numbers of inputs tied together can be used in other embodiments.

Figure 8:
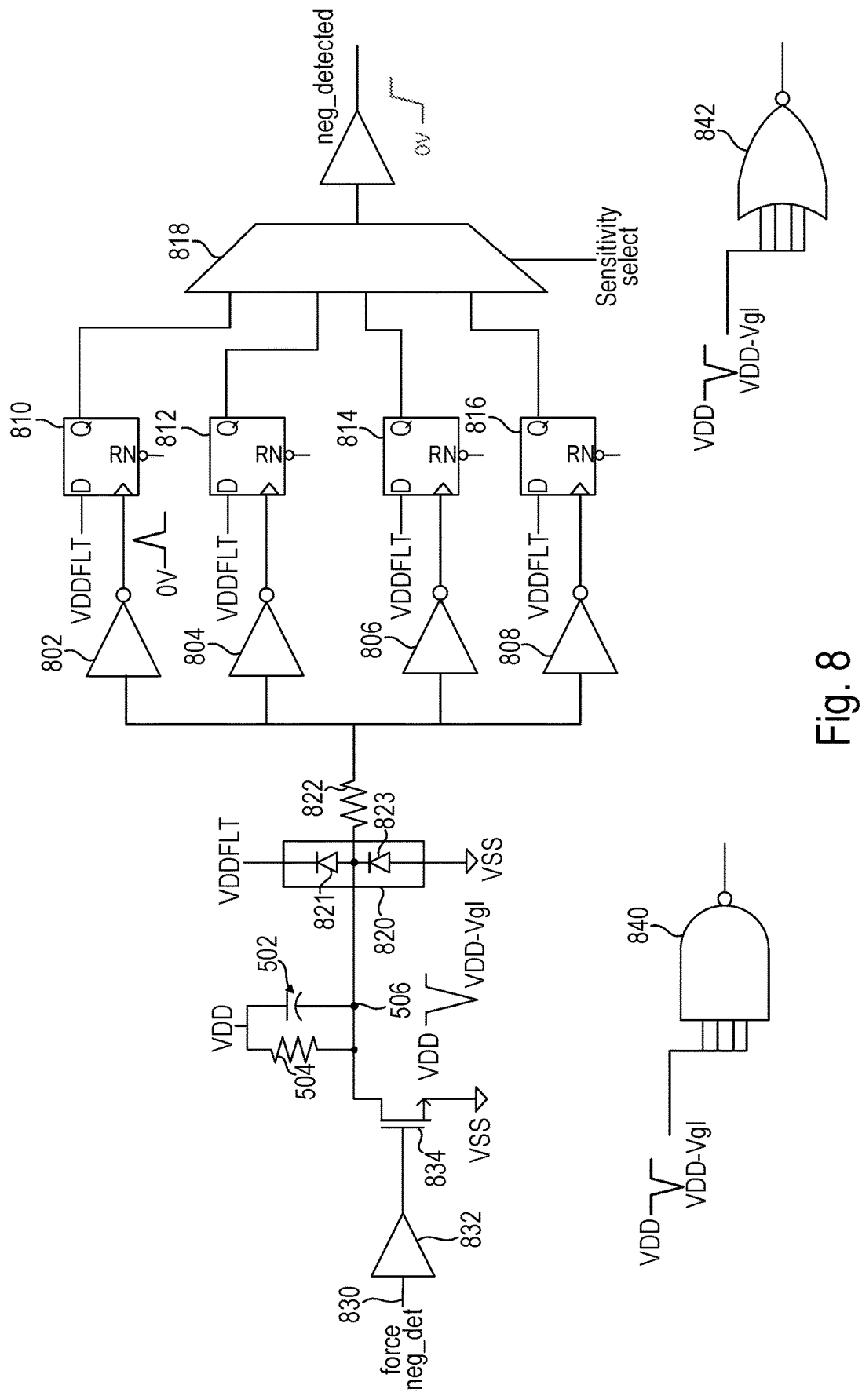
FIG. 8 illustrates additional details of an embodiment of a negative glitch detector.

FIG. 8 illustrates additional details of an embodiment of the negative glitch detector logic 210. It would be desirable to select a threshold for the glitch detector logic to trigger an alert. Accordingly, the detector logic includes inverting amplifier circuits 802, 804, 806, and 808 with different thresholds. The amplifiers respond to a sufficiently low voltage on their inputs by inverting the input signal and supplying a clock pulse to the latches 810, 812, 814, and 816 reflecting the negative voltage glitch. Thus, (−Vgl) has to have a large enough magnitude to cause (VDD−Vgl) to be low enough for the amplifier to generate a pulse. As (−Vgl) returns to 0 and VDD returns to its nominal value, the falling edge of the pulse is generated. As mentioned above, since some glitches on VDD are part of normal operation, e.g., power up and normal supply ripple, only those glitches that have a magnitude above a particular threshold are of interest. Multiplexer 818 selects the amplifier with the desired threshold. The selection of the amplifier may be fixed during manufacturing testing or dynamic and selected based, e.g., on temperature or supply voltage. Absent a way to ignore supply voltage glitches that will not impact secure chip operations, normal variations in the supply voltage could trigger a response that an attack was underway and interfere with normal chip operations. Such false positives should be avoided. In other embodiments, such as shown in FIG. 5, the desired threshold is known and a single amplifier is utilized.

FIG. 8 also shows a voltage clamp 820 that protects the detector logic from a large voltage spike on node 506. The upper diode 821 limits positive voltage spikes on node 506 that are greater than one diode threshold above VDD. The lower diode 823 limits negative voltage spikes on node 506 that are greater than one diode threshold below VSS. Of course, other types of voltage clamps can be used. Resistor 822 limits current to avoid destructive current levels being supplied to the amplifiers. FIG. 8 also shows the capacitor 502 and resistor 504 coupled in parallel between VDD and node 506 (also shown in FIG. 5). The resistor keeps node 506 biased to VDD absent a glitch event and the capacitor causes voltage on node 506 to be reduced to (VDD−Vgl). If (−Vgl) is of sufficient magnitude, the glitch causes the inverting amplifier to provide a clock pulse to the associated flip-flop clock input.

FIG. 8 illustrates a scan feature utilized in some embodiments to allow for stuck at fault testing for the latch(es) used in the negative voltage glitch detector and to check logic downstream of the latches. For the negative glitch detector the asserted forcing signal 830 is supplied to buffer 832, which in turn supplies the inverted forcing signal to the gate of pull-down transistor 834. The pull-down transistor 834 pulls down node 506 to a low level thereby causing neg-detected to be asserted.

The amplifier circuits 508 (FIG. 5) and 802-808 can be implemented using digital logic gates such as digital logic gates 840 or 842. For example, a four input NAND gate 840 with all the inputs tied together or a four input NOR gate 842 with all the inputs tied together can function as a suitable amplifier. The threshold voltage of the logic gates is selected so the logic state of the gate switches when (VDD−Vgl) passes below a chosen threshold. Of course, other configurations of logic gates can also be used.

Figure 9:
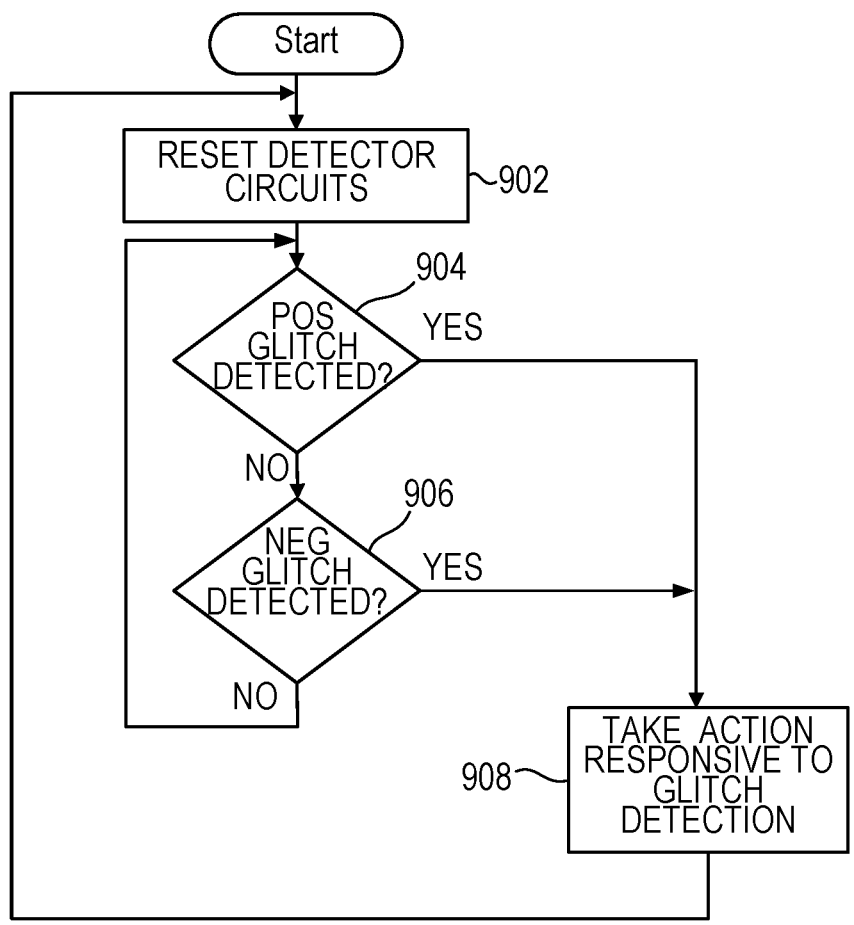
FIG. 9 is a flow chart illustrating utilization of glitch detectors in a system.

FIG. 9 illustrates a high level flow chart of operation of the glitch detectors. At 902 the glitch detectors are reset by asserting RN to reset the flip flops. At 904 and 906 the system waits for positive glitches or negative glitches to be detected. The glitch detectors work continuously while the system is operational. If either a positive or negative glitch is detected, the system responds to the attack in 908, the system responds in various ways based on the particular application for the integrated circuit. For example, a glitch detection may result in the integrated circuit being reset, the processor being interrupted to execute an interrupt routine to secure the integrated circuit from undesired tampering, erase sensitive data in memory (RAM and/or non-volatile memory) with or without processor control, or any combination of actions appropriate for the particular application. The system may also assert RN to reset the latches.

Thus, embodiments of positive and negative glitch detectors for detecting a tampering attack on an integrated circuit using have been described. The description of the invention set forth herein is illustrative and is not intended to limit the scope of the invention as set forth in the following claims. Other variations and modifications of the embodiments disclosed herein, may be made based on the description set forth herein, without departing from the scope of the invention as set forth in the following claims.

What is claimed is:

1. An integrated circuit comprising:
 a positive voltage glitch detector including,
  a filter coupled to a supply voltage node and configured to supply a filtered supply voltage;
  a capacitor coupled between the supply voltage node and a first node;
  a resistor coupled between the first node and a ground node;
  a first circuit having an input coupled to the first node, the first circuit being coupled to receive the filtered supply voltage as a first circuit supply voltage and the first circuit being configured to supply a first output signal;
  a latch circuit having a clock input coupled to the first output signal and having a data input coupled to the filtered supply voltage; and
  wherein responsive to a positive voltage glitch occurring on the supply voltage node, a positive voltage pulse is generated on the first node corresponding to the positive voltage glitch, the latch circuit is clocked by the first output signal, and a state of the latch circuit is changed and the latch circuit supplies an asserted output signal indicative of the positive voltage glitch.

2. The integrated circuit as recited in claim 1 wherein a power supply input of the latch circuit is coupled to the filtered supply voltage.

3. The integrated circuit as recited in claim 1 wherein the first node has a substantially zero voltage absent the positive voltage glitch.

4. The integrated circuit as recited in claim 1 wherein the filter is a low pass filter.

5. The integrated circuit as recited in claim 1 further comprising a pulldown circuit to force a desired voltage value onto the first node for test.

6. The integrated circuit as recited in claim 1 further comprising a negative glitch detector, the negative glitch detector including,
 a second capacitor coupled between the supply voltage node and a second node;
 a resistor coupled in parallel with the second capacitor between the supply voltage node and the second node;

a second circuit having an input coupled to the second node, the second circuit coupled to receive the filtered supply voltage as a second circuit supply voltage and the second circuit being configured to supply a second output signal;
a second latch circuit having a second clock input coupled to the second output signal and having a second data input coupled to the filtered supply voltage; and
wherein responsive to a negative voltage glitch occurring on the supply voltage node, a second node voltage on the second node is pulled down thereby causing the second circuit to supply a pulse that clocks the second latch circuit, and a state of the second latch circuit is changed to supply an asserted second latch output signal indicative of the negative voltage glitch.

7. The integrated circuit as recited in claim 6 wherein a power supply input of the second latch circuit is coupled to the filtered supply voltage.

8. The integrated circuit as recited in claim 6 wherein the second node has a logically high voltage absent the negative voltage glitch and a logically low voltage responsive to the negative voltage glitch.

9. The integrated circuit as recited in claim 6 further comprising a second forcing circuit to force a logically low voltage value onto the second node.

10. The integrated circuit as recited in claim 6 wherein the first circuit and the second circuit are each comprised of one or more logic gates.

11. A method of detecting glitches in an integrated circuit comprising:
filtering a supply voltage on a supply voltage node to generate a filtered supply voltage;
supplying the filtered supply voltage to a data input of a latch circuit;
responsive to a positive voltage glitch occurring on the supply voltage node, causing a voltage increase corresponding to the positive voltage glitch to appear on a first node between a capacitor and a resistor serially coupled between the supply voltage node and ground;
supplying the voltage increase on the first node to a first circuit and generating a first circuit output signal; and
clocking the latch circuit using the first circuit output signal to cause the latch circuit to supply an asserted latch signal indicative of the positive voltage glitch.

12. The method as recited in claim 11 further comprising supplying the filtered supply voltage to a power supply input of the latch circuit.

13. The method as recited in claim 11 further comprising maintaining a substantially zero voltage on the first node absent the positive voltage glitch.

14. The method as recited in claim 11 further comprising filtering the supply voltage using a low pass filter.

15. The method as recited in claim 11 further comprising selecting one of a plurality of logical circuits as the first circuit according to a desired threshold voltage of the first circuit.

16. The method as recited in claim 11 further comprising pulling up a voltage on the first node for testing responsive to assertion of a test control signal.

17. The method as recited in claim 11 further comprising:
biasing a second node at an input of a second circuit to a logical high voltage value using a resistor coupled between the second node and the supply voltage node;
supplying the filtered supply voltage to a data input of a second latch circuit;
causing a voltage on the second node to decrease by a voltage amount corresponding to a negative voltage glitch in response to the negative voltage glitch occurring on the supply voltage node; and
responsive to the decrease in voltage on the second node caused by the negative voltage glitch, supplying a rising edge from the second circuit to a clock input of a second latch circuit to cause the second latch circuit to supply an asserted second latch output signal indicative of the negative voltage glitch.

18. The method as recited in claim 17 further comprising supplying the filtered supply voltage to a power supply input of the second latch circuit.

19. The method as recited in claim 17 further comprising maintaining the second node at the logical high voltage value absent the negative voltage glitch.

20. The method as recited in claim 17 further comprising selecting one of a plurality of logical circuits as the second circuit according to a desired threshold voltage of the second circuit.

21. The method as recited in claim 17 further comprising pulling down the voltage on the second node for testing responsive to assertion of a second test control signal.

22. An integrated circuit comprising:
a filter coupled to a supply voltage node configured to receive a supply voltage and provide a filtered supply voltage;
a positive glitch detector circuit including,
a first capacitor and a first resistor that are serially coupled between the supply voltage node and ground;
a first amplifier circuit having an input coupled to a first node between the first capacitor and the first resistor and the first amplifier circuit configured to supply a first output signal;
a first latch circuit having a clock input coupled to the first output signal and having a data input coupled to the filtered supply voltage;
a negative glitch detector including,
a second capacitor and a second resistor coupled in parallel between the supply voltage node and a second node;
a second amplifier circuit having an input coupled to the second node and the second amplifier circuit being configured to supply a second output signal; and
a second latch circuit having a second clock input coupled to the second output signal and having a second data input coupled to the filtered supply voltage.

23. The integrated circuit as recited in claim 22,
wherein responsive to a positive voltage glitch occurring on the supply voltage node, a positive pulse is generated on the first node, the first amplifier circuit generates a rising edge on the first output signal and the first latch circuit is clocked by the first output signal to thereby cause a state of the first latch circuit to change and supply an asserted latch output signal indicative of the positive voltage glitch; and
wherein responsive to a negative voltage glitch occurring on the supply voltage node, a negative pulse is generated on the second node, the second amplifier circuit generates a rising edge on the second output signal to thereby cause a state of the second latch circuit to change and supply an asserted second latch output signal indicative of the negative voltage glitch.

* * * * *